(12) United States Patent
Stoppel et al.

(10) Patent No.: US 10,641,341 B2
(45) Date of Patent: May 5, 2020

(54) CONNECTION SYSTEM FOR CONNECTING A COMPONENT SUCH AS A SHAFT, HUB, BUSHING OR THE LIKE TO A GEAR WHEEL, THE GEAR WHEEL COMPRISING HELICAL GEARING

(71) Applicant: IMS Gear SE & Co. KGaA, Donaueschingen (DE)

(72) Inventors: Eugen Stoppel, Mühlingen (DE); Stephan Oberle, Villingen-Schwenningen (DE); Manuel Seidel, Dauchingen (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 238 days.

(21) Appl. No.: 15/628,177

(22) Filed: Jun. 20, 2017

(65) Prior Publication Data

US 2018/0031044 A1 Feb. 1, 2018

(30) Foreign Application Priority Data

Jul. 28, 2016 (EP) ..................................... 16181746

(51) Int. Cl.
*F16D 1/06* (2006.01)
*F16D 1/064* (2006.01)
(Continued)

(52) U.S. Cl.
CPC ............... *F16D 1/06* (2013.01); *F16D 1/064* (2013.01); *F16H 55/17* (2013.01);
(Continued)

(58) Field of Classification Search
CPC ...... F16D 1/06; F16D 1/064; F16D 2001/103; F16H 57/0025; F16H 55/17; Y10T 74/19953; Y10T 403/10; Y10T 403/7035
(Continued)

(56) References Cited

U.S. PATENT DOCUMENTS 2,069,433 A * 2/1937 Wildhaber ................ F16H 1/16
74/458 X
4,410,120 A 10/1983 Henk
(Continued)

FOREIGN PATENT DOCUMENTS

CN 101641528 2/2010
CN 107531187 1/2018
(Continued)

OTHER PUBLICATIONS

The Best Plastic Materials for High Friction Applications [online]. Craftech Industries. [retrieved Oct. 1, 2019]. Retrieved from the Internet:<https//www.craftechind.com>. (Year: 2019).*
(Continued)

*Primary Examiner* — Greg Binda
(74) *Attorney, Agent, or Firm* — Akerman LLP; Peter A. Chiabotti

(57) ABSTRACT

A connection system for connecting a component to a gear wheel, wherein the gear wheel comprises helical gearing having a tooth helix angle and a first connecting section, and the component comprises a second connecting section by way of which the component can be connected or is connected to the first connecting section, wherein the component, in the second connecting section, comprises at least one depression or elevation that is operatively connected to the first connecting section when the component is connected to the first connecting section, wherein the depression has a connection helix angle, and the connection helix angle is defined as follows: $0° \leq \alpha \leq \beta$. The disclosure furthermore relates to a device for transmitting a rotational movement, comprising a rotatable component and a gear wheel, wherein the gear wheel and the component are connected by way of such a connection system.

8 Claims, 3 Drawing Sheets

(51) Int. Cl.
*F16H 57/00* (2012.01)
*F16H 55/17* (2006.01)
*F16D 1/10* (2006.01)

(52) U.S. Cl.
CPC ... *F16H 57/0025* (2013.01); *F16D 2001/103* (2013.01); *Y10T 74/19953* (2015.01); *Y10T 403/10* (2015.01); *Y10T 403/7035* (2015.01)

(58) Field of Classification Search
USPC .......................................... 74/458; 403/359.6
See application file for complete search history.

(56) References Cited

U.S. PATENT DOCUMENTS

| | | | |
|---|---|---|---|
| 4,778,303 A | 10/1988 | Mullins | |
| 5,373,753 A * | 12/1994 | Toyomasa | F16H 1/163 74/458 X |
| 5,503,494 A | 4/1996 | Kamata et al. | |
| 6,644,431 B2 * | 11/2003 | Kuze | B62D 5/0409 |
| 8,398,327 B2 | 3/2013 | Lang et al. | |
| 2004/0060380 A1 | 4/2004 | Christ | |
| 2004/0107786 A1 | 6/2004 | Mawson et al. | |
| 2008/0146402 A1 | 6/2008 | Shinohara | |
| 2010/0003075 A1 | 1/2010 | Lang et al. | |

FOREIGN PATENT DOCUMENTS

| | | |
|---|---|---|
| DE | 10111900 | 9/2002 |
| DE | 102007005667 | 8/2008 |
| EP | 3023630 | 5/2016 |
| JP | 2008151277 | 7/2008 |
| WO | 02/059505 | 8/2002 |
| WO | 2016/163884 | 10/2016 |

OTHER PUBLICATIONS

European Patent Office, "Office Action,", issued in European patent application No. 16 1817465, dated Oct. 29, 2018, document of 5 pages.

Korean Intellectual Property Office, "KIPO Notification of Reason for Refusal," and English translation thereof, issued in Korean patent application No. 10-2017-0079680, dated Aug. 20, 2018, document of 12 pages.

The State Intellectual Property Office of the People's Republic of China, "First Office Action," and English translation thereof, issued in Chinese patent application No. 201710592528.6, dated Jun. 19, 2019, document of 12 pages.

* cited by examiner

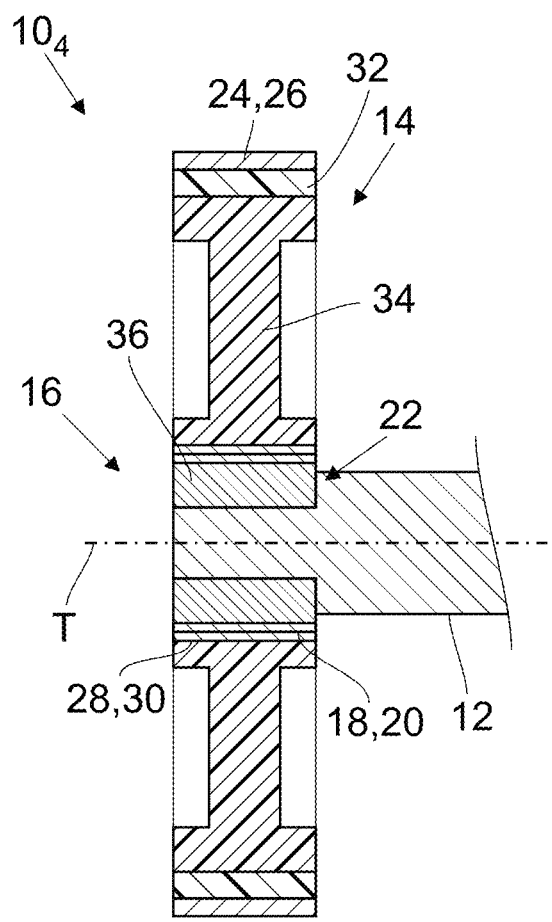
Fig.5
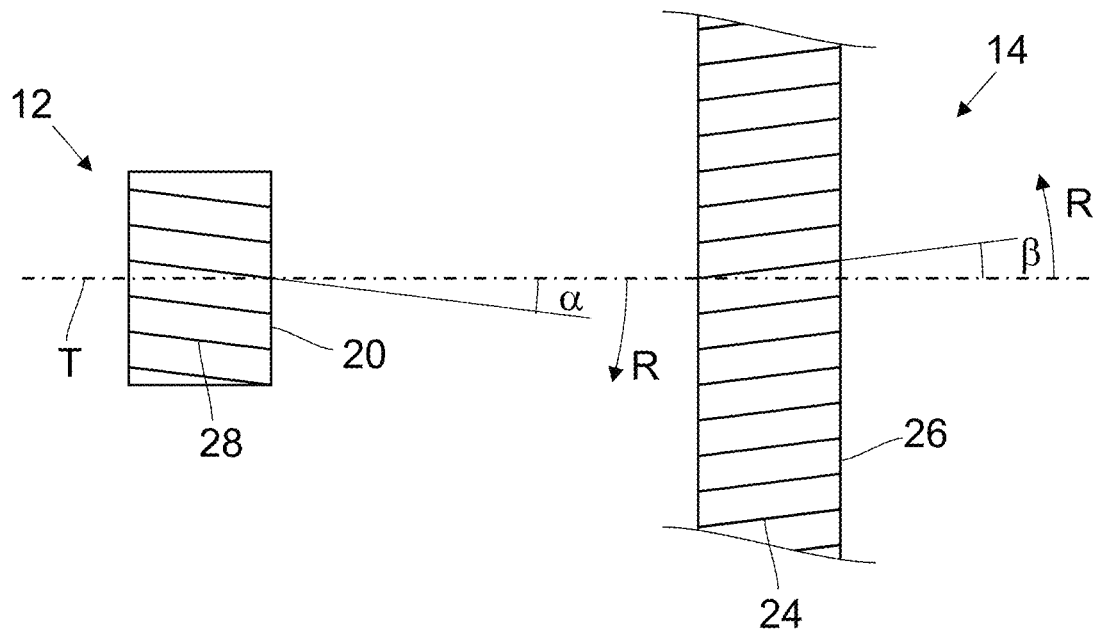
Fig.6A Fig.6B

CONNECTION SYSTEM FOR CONNECTING A COMPONENT SUCH AS A SHAFT, HUB, BUSHING OR THE LIKE TO A GEAR WHEEL, THE GEAR WHEEL COMPRISING HELICAL GEARING

CROSS-REFERENCE TO RELATED APPLICATIONS

This application claims priority to European Patent Application No. 16 181 746.5, filed Jul. 28, 2016, which is incorporated by reference in its entirety.

BACKGROUND

The present disclosure relates to a connection system for connecting a component, in particular a shaft, hub, bushing or the like, to a gear wheel, wherein the gear wheel comprises helical gearing. The disclosure furthermore relates to a device for transmitting a rotational movement, comprising a rotatable component such as a rotatable shaft, hub, bushing or the like, and a gear wheel, wherein the gear wheel and the rotatable component are connected by way of such a connection system. The connection system can be used to non-rotatably connect the gear wheel to the component, so that torque can be transmitted.

SUMMARY

Compared to spur gearing, helical gearing has the following advantages, among other things. Improved running smoothness and lower noise development can be achieved by way of helical gearing since every gear wheel pair engages one another in a continuous transition, and thus torque transmission takes place more uniformly than with spur gearing. Compared to a straight-toothed gear wheel pair having comparable dimensions and the same number of teeth, moreover the tooth root and tooth flank load-bearing capacities are slightly higher.

In the case of helical gearing, not only tangentially acting, but also axially acting forces are transmitted, relative to the rotational axis. Electrical steering devices of motor vehicles especially are often subjected to very high axially acting forces, which is why the gear wheel experiences accordingly high axial loads. As a result of the axial load, a tilting moment is introduced into the gear wheel, whereby the gear wheel becomes deformed and the running smoothness and the noise development are adversely affected. Moreover, faulty engagements occur, and the service life of the gear wheel is reduced.

One known example for such connection systems are shaft/hub connections, in which axial loads are frequently transmitted at least partially by the component surrounded by the gear wheel, and in particular the shaft, being provided with a projection against which the hub of the gear wheel is seated. This, however, creates a point load on the connection system, resulting in a tilting moment, whereby the gear wheel is able to detach from the component, such as from the shaft, hub, bushing or the like. Depending on the design of the gear wheel, what is known as lift-off may occur, or skipping of the gear wheel may take place in relation to the hub. While poorer running smoothness and increased noise development do not have any significant influence on the function of the torque transmission from the component to the gear wheel and the gear wheel pair, torque transmission is no longer possible when the connection system fails.

So as to reduce the load on the connection system, the tooth helix angle of the helical gearing may be reduced. This, however, to a large extent cancels out the advantage of helical gearing mentioned at the outset, in particular the uniform torque transmission and the low noise development. The load on the connection system can be reduced through the use of very stiff materials, for example through the use of steel; however, this increases the manufacturing costs, the weight and the noise development compared to soft materials such as plastic.

In one embodiment of the present disclosure, a connection system is provided that, regardless of the material used for the component, and in particular for the shaft, hub, bushing or the like, and for the gear wheel, has an increased load-bearing capacity compared to known connection systems.

The present disclosure provides a connection system having the features and structures disclosed herein. Advantageous embodiments of the present disclosure are also disclosed herein.

One embodiment of the disclosure relates to a connection system for connecting a component, and in particular a shaft, hub, bushing or the like, to a gear wheel, wherein the gear wheel comprises helical gearing having a tooth helix angle $\beta$ and a first connecting section, and the component comprises a second connecting section by way of which the component can be connected or is connected to the first connecting section, wherein the component, at least in the second connecting section, comprises at least one depression or elevation that is operatively connected to the first connecting section when the component is connected to the first connecting section, wherein the depression or the elevation has a connection helix angle $\alpha$, and the connection helix angle $\alpha$ is defined as follows: $0° < \alpha \leq \beta$.

Both the connection helix angle $\alpha$ and the tooth helix angle $\beta$ are based on the rotational axis about which the component and the gear wheel rotate. Due to the fact that the at least one depression or elevation has the connection helix angle $\alpha$, it is possible, for example, to also transmit axial forces between the gear wheel and the component along the entire depression or elevation, in contrast to frequently used splined shaft connections. The resulting more uniform load at least considerably reduces a point load, and considerably decreases the tilting moment, which results in the above-mentioned failure occurrences such as lift-off and skipping, whereby the risk of a failure of the connection system decreases. Moreover, it is also possible to transmit higher torque and axial forces via the connection system designed according to the disclosure. Consequently, both the component and the gear wheel can have smaller dimensions, and consequently a more material-saving design, at a particular torque to be transmitted and a particular axial load.

In a further embodiment, the connection helix angle $\alpha$ and the tooth helix angle $\beta$ have the same sense of rotation. The sense of rotation is based on the rotational axis and is derived from the direction in which a straight line, proceeding from the rotational axis, must be rotated about a fulcrum extending through the rotational axis by the magnitude of the connection helix angle or the tooth helix angle so as to run parallel to the depression or elevation or the helical gearing. When the connection helix angle and the tooth helix angle have the same sense of rotation, it is possible to achieve a particularly uniform load on the connection system, whereby the tendency of the connection system to fail can be reduced further.

A further embodiment is characterized in that the component, in the second connecting section, comprises a number of depressions or elevations, and the helical gearing of the gear wheel comprises the same number of teeth. This embodiment is in particular an obvious choice when the diameter of the component in the second connecting section, or the diameter of the gear wheel in the first connecting section, is only slightly smaller than the diameter of the helical gearing. In this case, the wall thickness of the gear wheel is relatively thin, so that, if the number of depressions or elevations and the number of the teeth are selected to be the same, fluctuations in the wall thickness of the gear wheel can be minimized. In a cutting plane perpendicular to the rotational axis, the gear wheel then approximately has the shape of an undulated circular ring surrounding the rotational axis. Due to the substantially constant and uniform wall thickness of the gear wheel, stress peaks and failure spots are avoided, whereby the strength of the gear wheel is increased.

According to a further embodiment, the first connecting section comprises protrusions corresponding to the depression or depressions. In contrast to a gear wheel molded around the component, in this way a detachable, form-locked connection can be achieved, yielding in particular the advantage that, if the gear wheel or the component, and in particular the shaft, hub, bushing or the like is damaged during operation, either only the gear wheel or only the component has to be replaced, but not both parts simultaneously. This decreases the material consumption, and moreover the costs incurred during replacement can be minimized. The same applies analogously if the second connecting section comprises a number of elevations, and the first connecting section comprises recesses corresponding to the elevations.

According to a further embodiment, the gear wheel is made of a softer material than the component. When the gear wheel is made of a soft material, such as plastic, the noise development can be reduced compared to one that is made of a hard material, such as steel. Moreover, the softer material can be selected such that the loads occurring during operation can be absorbed particularly well, and the production of the gear wheel can be kept particularly simple. It may also be an obvious choice for this purpose to produce the gear wheel by way of an injection molding method and to insert mold the component during production. In this case, a separate step for producing the connection system is dispensed with, which shortens production and thus makes it more cost-effective.

It is an obvious choice that the gear wheel comprises a toothed ring, in which the helical gearing is disposed, and a connecting part, which comprises the first connecting section, and that the toothed ring is made of a softer material than the connecting part. The toothed ring located on the outside surrounds the connecting part. As mentioned above, the noise development may be reduced, for example, by producing the gear wheel from a softer material than the component. In many cases, however, the axial loads mentioned at the outset result in major deformations of the gear wheel when soft materials are used, so that the softer the material, the greater is the tendency toward lift-off and skipping. In this embodiment, it is possible to produce the toothed ring of a softer material than the connecting part, so that the noise development can be minimized, without having to tolerate excessive deformation of the gear wheel. Consequently, it is possible for the connection system to absorb higher axial forces, without the noise development increasing.

The component can furthermore include a hub part, which comprises the second connecting section, wherein the connecting part is disposed between the toothed ring and the hub part, and the toothed ring is made of a softer material than the connecting part (34), and the connecting part is made of a softer material than the hub part (36). In this embodiment, the connection system comprises a total of three different materials, so that it is particularly easily possible to take the respective requirements in regard to the particular parts of the gear wheel into consideration in the material selection. As was already mentioned above, the noise development may be reduced by using a particularly soft material for the toothed ring. The deformation of the gear wheel in total can be decreased by using a harder material for the connecting part compared to the toothed ring. The torque and forces transmittable by the connection system can be increased by producing the hub part from a material that is harder than the material of the connecting part.

One embodiment of the disclosure relates to a device for transmitting a rotational movement, comprising a rotatable shaft, hub, bushing or the like, and a gear wheel, wherein the gear wheel and the component are connected by way of a connection system according to one of the preceding embodiments. The technical effects and advantages that can be achieved by way of the embodiment of the device as proposed correspond to those that were described for the various embodiments of the connection system. In summary, it shall be pointed out that, in contrast to splined shaft connections, for example, it is also possible to transmit axial forces between the gear wheel and the component along the entire depression. As a result of the more uniform loading thus achieved, the tilting moment, which results in the above-mentioned failure occurrences such as lift-off and skipping, is considerably reduced, whereby the risk of a failure of the connection system decreases.

A further embodiment of the disclosure relates to an electrical steering device for a motor vehicle, comprising a device according to the above-described embodiment. The technical effects and advantages that can be achieved by way of the design of the electrical steering device as proposed correspond to those that were described for the various embodiments of the connection system. A further embodiment of the disclosure moreover relates to the use of a connection system according to one of the above-described embodiments for steering devices, and in particular for electrical steering devices, of motor vehicles.

BRIEF DESCRIPTION OF THE DRAWINGS

Exemplary embodiments of the disclosure will be described in more detail hereafter with reference to the accompanying drawings. In the drawings:

FIG. 5 shows a fourth exemplary embodiment of a device according to the disclosure for transmitting a rotational movement, comprising a component and a gear wheel;

FIG. 6a) shows a developed view of the second connecting section of the component shown in FIG. 5; and FIG. 6b) shows a developed view of the gear wheel shown in FIG. 5.

DETAILED DESCRIPTION

Figure 1:
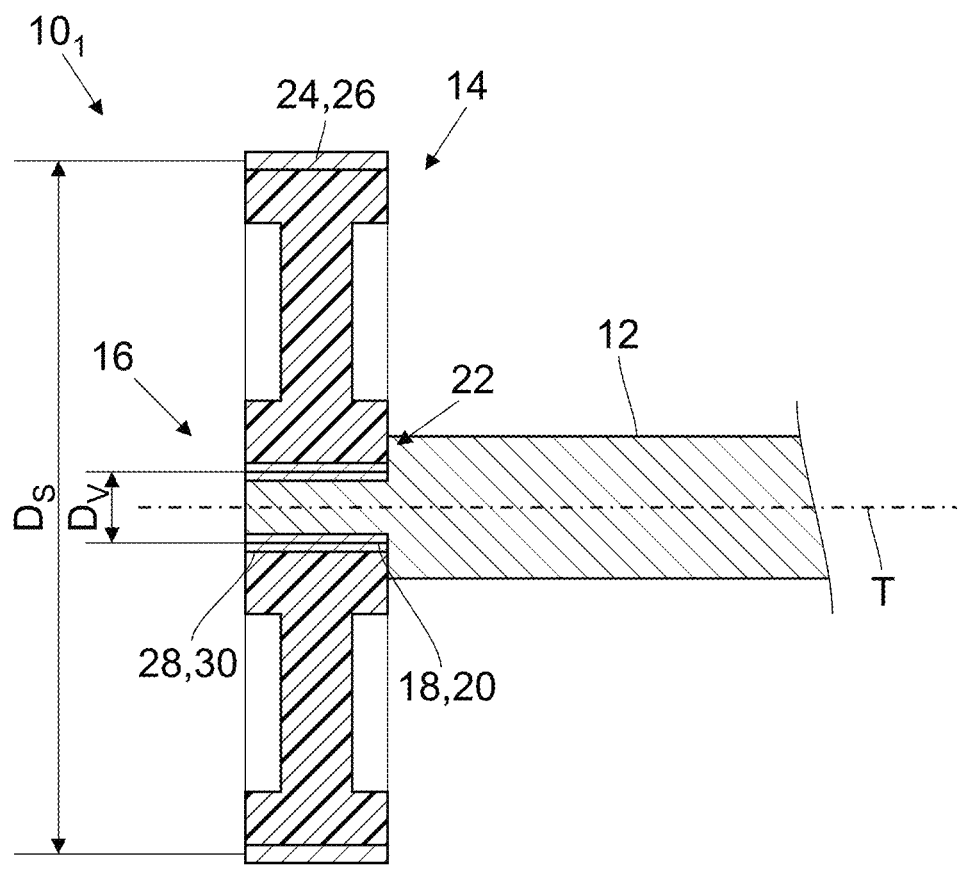
FIG. 1 shows a first exemplary embodiment of a device according to the disclosure for transmitting a rotational movement, comprising a component and a gear wheel.

FIG. 1 shows a first exemplary embodiment of a device $10_1$ for transmitting a rotational movement based on a schematic sectional illustration. The device $10_1$ comprises a component 12, for example a shaft, a hub or a bushing, which can be rotated about a rotational axis T. In the illustrated example, the component 12 shall be a shaft. Furthermore, the device $10_1$ comprises a gear wheel 14, which is non-rotatably connected to the component 12 by way of a connection system 16, so that torque can be transmitted from the component 12 to the gear wheel 14. In the illustrated embodiment, the connection system 16 is designed as a shaft/hub connection.

So as to form the connection system 16, the gear wheel 14 comprises a first connecting section 18, and the component 12 comprises a second connecting section 20. The second connecting section 20 has a smaller diameter than the remaining component 12, whereby a projection 22 is created by way of which the first connecting section 18, and consequently the gear wheel 14, is axially positioned with respect to the component 12. The gear wheel 14 comprises a number of teeth 24, which form helical gearing 26. For the sake of illustration, the teeth 24 and the helical gearing 26 are symbolically identified by a hatched area.

Figures 2A, 2B:
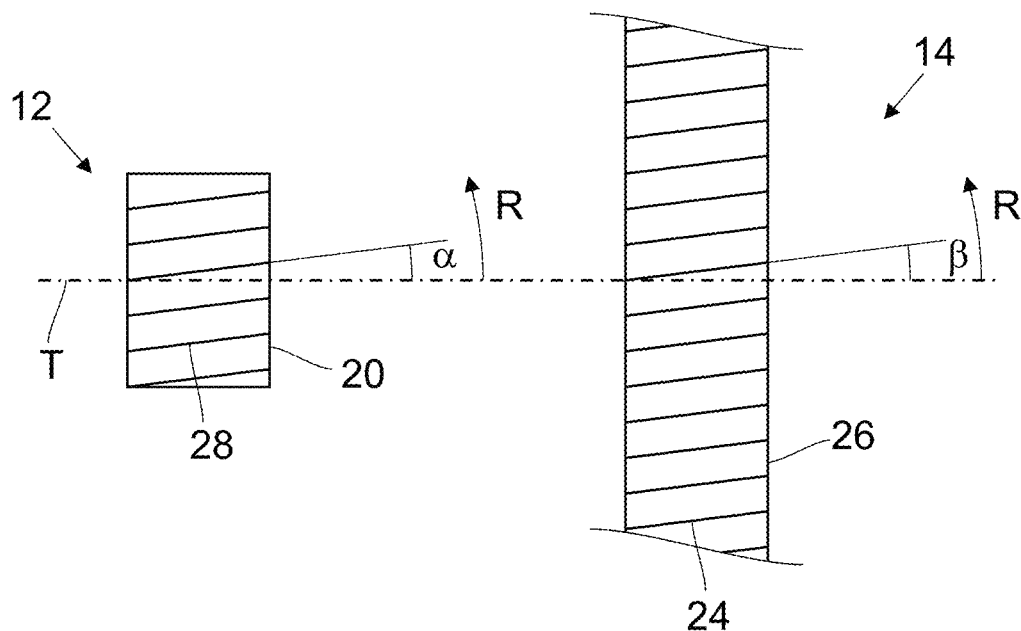
FIG. 2a) shows a developed view of a second connecting section of the component shown in FIG. 1.
FIG. 2b) shows a developed view of the gear wheel shown in FIG. 1.

FIG. 2a) shows a developed view of the second connecting section 20 of the component 12 shown in FIG. 1, and FIG. 2b) shows a developed view of the gear wheel 14. In both instances, the view is onto the outer circumference of the second connecting section 20 of the component 12 or of the gear wheel 14. The teeth 24 of the helical gearing 26 of the gear wheel 14 form a tooth helix angle β with the rotational axis T. A number of depressions 28 or elevations 28 are disposed on the second connecting section 20 of the component 12, which form a connection helix angle α with the rotational axis T. In the illustrated example, the connection helix angle α and the tooth helix angle β have the same size. According to the disclosure, the connection helix angle α is either equally as large as the tooth helix angle β or smaller than the tooth helix angle β, but larger than 0°. Both the tooth helix angle β and the connection helix angle α have the same sense of rotation R with respect to the rotational axis T.

Not shown is one embodiment in which the depressions 28 are designed so as to form a stop for the component 12, whereby the projection 22 is not required.

The gear wheel 14 shown in FIG. 1 is made completely of one material, for example steel or plastic. Regardless of whether the gear wheel 14 is made of steel or plastic, the first connecting section 18 can comprise protrusions 30 corresponding to the depressions 28, whereby the connection system 16 can have a form-locked and releasable design. The depressions 28 and the protrusions 30 corresponding thereto are identified by way of a hatched area for illustration purposes. In the case where the second connecting section 20 comprises a number of elevations 28, the first connecting section 18 can comprise a number of recesses 30 corresponding thereto. In this way, a releasable form-locked connection can be provided between the gear wheel 14 and the component 12. In the case where the gear wheel 14 is made of plastic material, the gear wheel 14 can be molded around the component 12 already during production. In this case, no connection system 16 that can be non-destructively released is created between the gear wheel 14 and the component 12.

Figure 3:
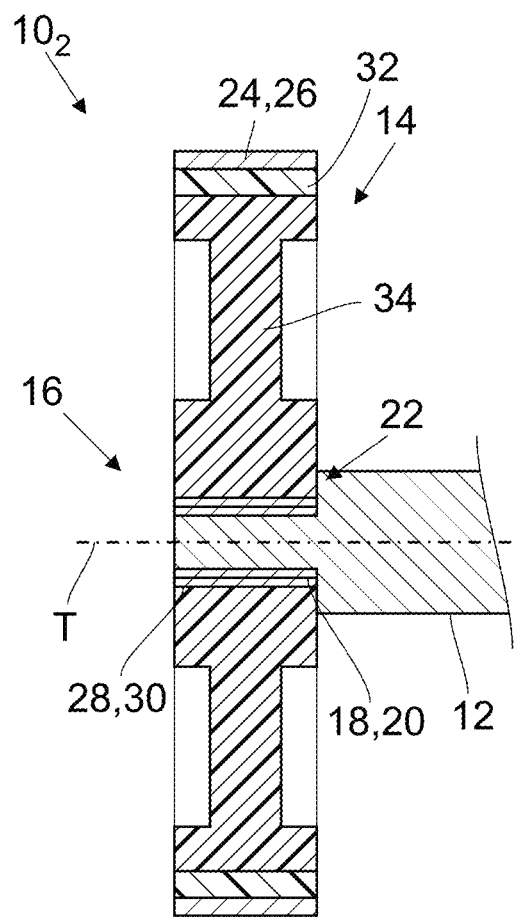
FIG. 3 shows a second exemplary embodiment of a device according to the disclosure for transmitting a rotational movement, comprising a component and a gear wheel.

FIG. 3 shows a second exemplary embodiment of the device $10_2$ according to the disclosure for transmitting a rotational movement, likewise based on a schematic sectional illustration. The essential composition of the device $10_2$ according to the second exemplary embodiment of corresponds to that of the first exemplary embodiment $10_1$. In this exemplary embodiment, however, the gear wheel 14 comprises a separate toothed ring 32, in which the helical gearing 26 is disposed. Furthermore, the gear wheel 14 comprises a connecting part 34, which forms the first connecting section 18. The toothed ring 32 is made of a softer material than the connecting part 34.

Figure 4:
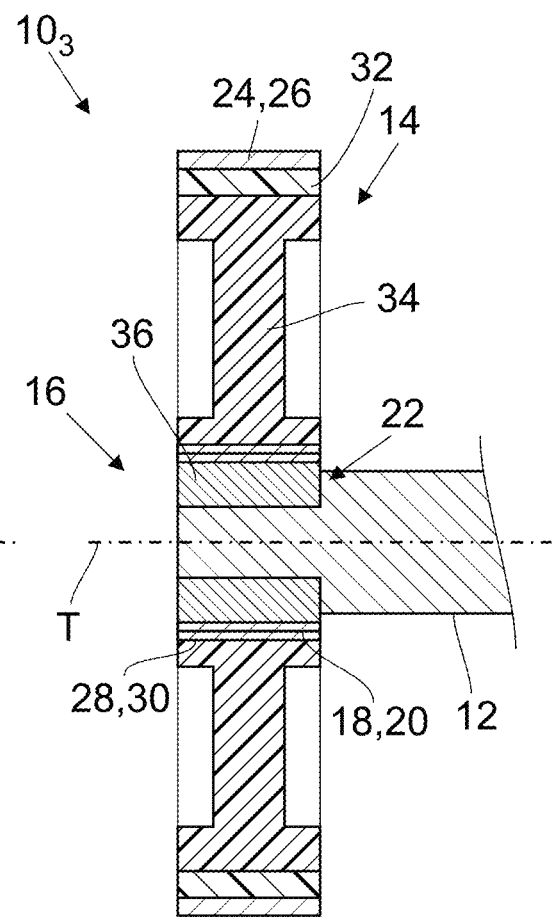
FIG. 4 shows a third exemplary embodiment of a device according to the disclosure for transmitting a rotational movement, comprising a component and a gear wheel.

FIG. 4 shows a third exemplary embodiment of the device $10_3$ according to the disclosure, again based on a schematic sectional illustration. Once again, the essential composition of the device $10_1$ is similar to that of the above-shown exemplary embodiments. As in the second exemplary embodiment, the gear wheel 14 comprises the toothed ring 32 and the connecting part 34. In addition to the shaft, the component 12 also comprises a hub part 36, which forms the second connecting section 20. The toothed ring 32 is made of a soft material, while the connecting part 34 is made of a harder material in relation to the material of the toothed ring 32, and the hub part 36 is made of the hardest material. In the exemplary embodiment shown in FIG. 4, the hub part 36 is made of steel and connected to the shaft 12 by way of a known press fit connection. The hub part 36 can serve as an adapter between the gear wheel 14 and the shaft of the component 12, for example so as to compensate for differences in diameter.

Both in the second and in the third exemplary embodiment, it is an obvious choice to produce the gear wheel 14 from plastic material, wherein the differing materials are selected such that the functions of the toothed ring 32 of the connecting part 34 and of the hub part 36 can be optimally satisfied. The component 12, which is implemented in particular as a shaft, hub or bushing, is usually made of steel, but may also be made of plastic material. It may be an obvious choice to produce the hub part 36 and the shaft or other elements of the component 12 from the same material, making joining the same simpler. If the shaft and the hub part 36 are made of the same steel, they may be welded to one another or joined to one another by way of a press fit.

In the developed view, the second connecting sections 20 correspond to the component 12 shown in FIG. 3, or the hub part 36 shown in FIG. 4, and the gear wheels 14 shown in FIGS. 3 and 4 correspond to FIGS. 2a) and 2b). In particular, both the connection helix angle α and the tooth helix angle β have the same sense of rotation R with respect to the rotational axis T.

FIG. 5 shows a fourth exemplary embodiment of the device $10_4$ according to the disclosure, again based on a schematic sectional illustration. The fourth exemplary embodiment essentially corresponds to the third exemplary embodiment shown in FIG. 4, however the tooth helix angle β and the connection helix angle α have a different, opposite sense of rotation with respect to the rotational axis T, which is also symbolized by the hatched areas used for the helical gearing 26 and depressions 28 or elevations 28, which do not run parallel, but perpendicularly to one another.

FIG. 6a) shows a developed view of the second connecting section 20 of the hub part 36 shown in FIG. 5, and FIG. 5b) shows a developed view of the gear wheel 14 shown in FIG. 5, each being shown in accordance with the fourth exemplary embodiment of the device $10_4$ according to the disclosure. The selected representation corresponds to that from FIGS. 2a) and 2b). In contrast to the exemplary embodiments, which relate to FIGS. 2a) and 2b), the tooth helix angle β and the connection helix angle α according to the fourth exemplary embodiment $10_4$ have a different, opposite sense of rotation R with respect to the rotational axis T.

Hereafter, it is deduced why the connection helix angle α is to be selected smaller than, or at most equal to, the tooth helix angle β. The helical gearing 26 allows not only tangentially, but also axially acting forces and torque to be transmitted. The resulting axial forces $F_{aS}$ acting on the helical gearing 26 (running gear teeth) act counter to the axial forces $F_{aV}$ (synchronization teeth) acting between the two connecting sections 18, 20. It is to be achieved that the axial forces acting on the helical gearing, in terms of magnitude, are not greater than the forces acting between the two connecting sections 18, 20. The relationship of the axial forces $F_{aS}$ and $F_{aV}$ can be expressed by the following formula:

$$F_{aV} = F_{tV} \tan \alpha \leq F_{aS}$$

$F_{aV}$: axial force acting between the connecting sections 18, 20

$F_{tV}$: tangential force acting between the connecting sections 18, 20

$F_{aS}$: axial force acting on the helical gearing 26

The tangential force $F_{tV}$ is calculated from the torque to be transmitted and the diameter on which the force engages:

$$F_{tV} = 2M_z/D_v$$

$M_z$: moment acting on the gear wheel $D_v$: diameter or pitch circle of the connecting sections 18, 20

$D_s$: diameter or pitch circle of the helical gearing 26

This reduces deformation and increases the performance capability of the gear wheel 14. Ideally, $$F_{aV} = F_{aS}$$

Since the moment acting on the helical gearing 26 is identical to the supporting torque in the connecting sections 18, 20, the ideal tooth helix angle b is derived as follows:

$$\tan \alpha = \tan \beta Dv/Ds$$

Since $D_v/D_s$ is always <1, the connection helix angle α is to be selected smaller than the tooth helix angle β or at most approximately the same.

| List of Reference Numerals | |
|---|---|
| 10, $10_1$, $10_3$ | device |
| 12 | component |
| 14 | gear wheel |
| 16 | connection system |
| 18 | first connecting section |
| 20 | second connecting section |
| 22 | projection |
| 24 | tooth |
| 26 | helical gearing |
| 28 | depression, elevation |
| 30 | protrusion, recess |
| 32 | toothed ring |
| 34 | connecting part |
| 36 | hub part |
| R | sense of rotation |
| T | rotational axis |
| α | connection helix angle |
| β | tooth helix angle |

The invention claimed is:

1. A connection system, comprising:
 a gear wheel that comprises:
  helical gearing having a tooth helix angle (β); and
  a first connecting section; and
 a rotatable component connected to the gear wheel, the rotatable component comprising:
 a second connecting section connecting the component to the first connecting section, wherein the second connecting section comprises a depression or elevation that is operatively connected to the first connecting section when the component is connected to the first connecting section, wherein the depression or the elevation has a connection helix angle (α) defined as 0°<α≤β; and
 wherein the connection helix angle (α) and the tooth helix angle (β) have the same sense of rotation.

2. The connection system according to claim 1, wherein the rotatable component, in the second connecting section, comprises a plurality of depressions or elevations, and the helical gearing of the gear wheel comprises a same number of teeth.

3. The connection system according to claim 1, wherein the first connecting section comprises protrusions corresponding to one or more depressions.

4. The connection system according to claim 1, wherein the gear wheel is made of a gear wheel material and the rotatable component is made of a rotatable component material and the gear wheel material is relatively softer than the rotatable component material.

5. The connection system according to claim 1,
 wherein the gear wheel comprises:
  a toothed ring made of a toothed ring material and in which the helical gearing is disposed, and
  a connecting part made of a connecting part material and which comprises the first connecting section, and
 wherein the toothed ring material is softer than the connecting part material.

6. The connection system according to claim 5,
 wherein the component comprises a hub part made of a hub part material and which comprises the second connecting section,
 wherein the connecting part is disposed between the toothed ring and the hub part, and
 wherein the connecting part material is softer than the hub part material.

7. A connection system, comprising:
 a gear wheel that comprises:
  a toothed ring with a helical gearing having a tooth helix angle (β);
  a first connecting part that forms a first connecting section;
  wherein the first connecting part is made of a first material;
  wherein the toothed ring is made of a second material, wherein the first material is relatively softer than the second material; and
 a rotatable component connected to the gear wheel, the rotatable component comprising:
  a hub part made of a third material, wherein the second material is softer than the third material;
  a second connecting section disposed between the toothed ring and the hub part, the second connecting section connecting the component to the first connecting section, wherein the second connecting section comprises a depression or elevation that is operatively connected to the first connecting section when the component is connected to the first connecting section, wherein the depression or the elevation has a connection helix angle ($\alpha$) defined as $0° < \alpha \leq \beta$; and wherein the connection helix angle ($\alpha$) and the tooth helix angle ($\beta$) have the same sense of rotation.

8. The connection system of claim 7, wherein the rotatable component is selected from the group consisting of a shaft, hub, or bushing.

* * * * *